United States Patent
Tanabe

(10) Patent No.: US 6,433,889 B1
(45) Date of Patent: Aug. 13, 2002

(54) IMAGE PROCESSING APPARATUS AND METHOD

(75) Inventor: Ritsushi Tanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/069,761

(22) Filed: Apr. 30, 1998

Related U.S. Application Data

(62) Division of application No. 08/039,746, filed on Mar. 30, 1993, now Pat. No. 5,777,758.

(30) Foreign Application Priority Data

Mar. 31, 1992 (JP) .............................................. 4-076512

(51) Int. Cl.⁷ ............................................. B41B 27/00
(52) U.S. Cl. ....................... 358/1.9; 358/450; 358/518; 382/164; 382/167
(58) Field of Search ......................... 358/1.9, 450, 452, 358/518, 520; 382/164, 165, 275, 274, 167

(56) References Cited

U.S. PATENT DOCUMENTS

| | | | |
|---|---|---|---|
| 4,958,219 A | 9/1990 | Kadowaki | 358/75 |
| 5,029,227 A | 7/1991 | Kawamura | 382/54 |
| 5,031,034 A | 7/1991 | Shimizu et al. | 358/79 |
| 5,047,844 A | 9/1991 | Ikeda et al. | 358/80 |
| 5,113,252 A | 5/1992 | Horie et al. | 358/77 |
| 5,119,185 A | 6/1992 | Ikeda et al. | 358/75 |
| 5,126,838 A | 6/1992 | Ohsawa et al. | 358/75 |
| 5,239,383 A | 8/1993 | Ikeda et al. | 358/300 |
| 5,315,382 A | 5/1994 | Tanioka | 358/523 |
| 5,659,770 A * | 8/1997 | Yamada | 395/792 |
| 5,721,628 A | 2/1998 | Takaragi et al. | 358/518 |
| 5,729,624 A | 3/1998 | Tanioka et al. | 382/162 |
| 5,732,153 A | 3/1998 | Ohsawa | 382/191 |
| 5,822,503 A * | 10/1998 | Gass, Jr. et al. | 395/109 |
| 5,984,446 A * | 11/1999 | Silverbrook | 347/3 |
| 5,999,710 A * | 12/1999 | Smith et al. | 395/114 |
| 6,002,847 A * | 12/1999 | Silverbrook | 395/116 |

* cited by examiner

Primary Examiner—Thomas D. Lee
Assistant Examiner—Karen C Kianni
(74) Attorney, Agent, or Firm—Fitzpatrick, Cella, Harper & Scinto

(57) ABSTRACT

A printer system and method for printing a clear image. When black characters or characters printed in a black reverse are expanded, the contours thereof are printed in black only and the inside or the outside of the contours which are designated to be printed in black color are printed in the three colors such as magenta, cyan and yellow in half tone or in an pseudo-half tone as well as in black. Image data is expanded on a image memory according to instructions from a computer. A black-color determining unit determines whether or not the expanded image data includes a black pixel and an edge extracting unit extracts an edge pixel in the expanded image data. A selector selects a black color only for a black edge portion and selects other colors in a half tone or in a pseudo-half tone as well as in black for a black but non-edge portion. It outputs the image according to such selections to a color printer.

8 Claims, 9 Drawing Sheets

| SELECT SIGNAL | | OUTPUT SIGNAL | |
|---|---|---|---|
| S104 | S105 | S108 ( C, Y, M ) | S108 ( Bk ) |
| L | L | S103 | S103 |
| H | H | 0 0 | F F |
| H | L | 7 F | F F |

IMAGE PROCESSING APPARATUS AND METHOD

This is a divisional application of parent application No. 08/039,746, filed Mar. 30, 1993, U.S. Pat. No. 5,777,758.

BACKGROUND OF THE INVENTION

1. Field of the Invention

The present invention relates to an image processing apparatus and method for a printer interface for expanding images based on command data which are designated by image processing instructions, such as used in a page description language, from a computer and for outputting the expanded images to a printer.

2. Description of the Related Art

A conventional printer system for expanding color images according to page description language and for outputting the expanded images to a color printer expands the color images on each color plane based on the colors (cyan, magenta, yellow and black, or red, green and blue) which are designated by page description language.

However, in the above-mentioned conventional example, when black characters or black pictures are created, toner or ink of the colors such as cyan, magenta and yellow are overlapped and then outputted. Therefore, there are the following problems.

(1) The amount of overlapped toner or ink is too great so that toner scatters or the recording paper is crumpled by the ink.
(2) Color fringing occurs in the contours of the characters.

SUMMARY OF THE INVENTION

In view of the foregoing problems, an object of the present invention is to provide an image processing apparatus and method for a printer system for clearly printing edge portions of a black character or image. Another object of the invention is to prevent the toner from scattering or the paper from being crumpled by the ink and for further preventing color fringing of the contours of the characters.

To achieve this object, the present invention is provided with the following construction.

That is, a printer interface comprises receiving means for receiving command data from an external device; expanding means for expanding image data according to the received command data; storing means for storing the expanded image data; determining means for determining whether or not the expanded image data represents a specific-color pixel; extracting means for extracting a pixel in an edge-portion from the expanded image data; and processing means for processing the expanded image data and outputting the processed image data to a printer, wherein said processing means performs a first process on a pixel which is determined as the specific-color pixel and is in the edge portion and performs a second process, different form the first process, on a pixel which is determined as the specific-color and is not in the edge portion.

A printer interface may also comprise expanding means for expanding color image data according to a given instruction; storing means for storing the expanded color image data; determining means for determining whether or not the expanded color image data represents a black-color pixel; extracting means for extracting a pixel from an edge portion of the expanded color image data; and output means for outputting the expanded color image data at an edge portion of the black color in black only to a printer and for outputting the expanded color image data at a non-edge portion of the black color in a half tone or a pseudo-half tone as well as in black to the printer, according to the results obtained by said determining means and said extracting means.

The present invention also provides a printer including the whole of or part of construction as stated above. Further, the present invention provides a printer including input means or creating means for the image data.

In the above-mentioned constructions, even when black characters or characters printed in a black reverse are expanded, the contours thereof can be printed in black only and the inside or the outside of the contours which are designated to be printed in black color can be printed in the three colors such as magenta, cyan and yellow in a half tone or in a pseudo-half tone as well as in black.

Further objects, features and advantages of the present invention will become apparent from the following description of the invention with reference to the attached drawings.

DESCRIPTION OF THE PREFERRED EMBODIMENTS

Figure 1:
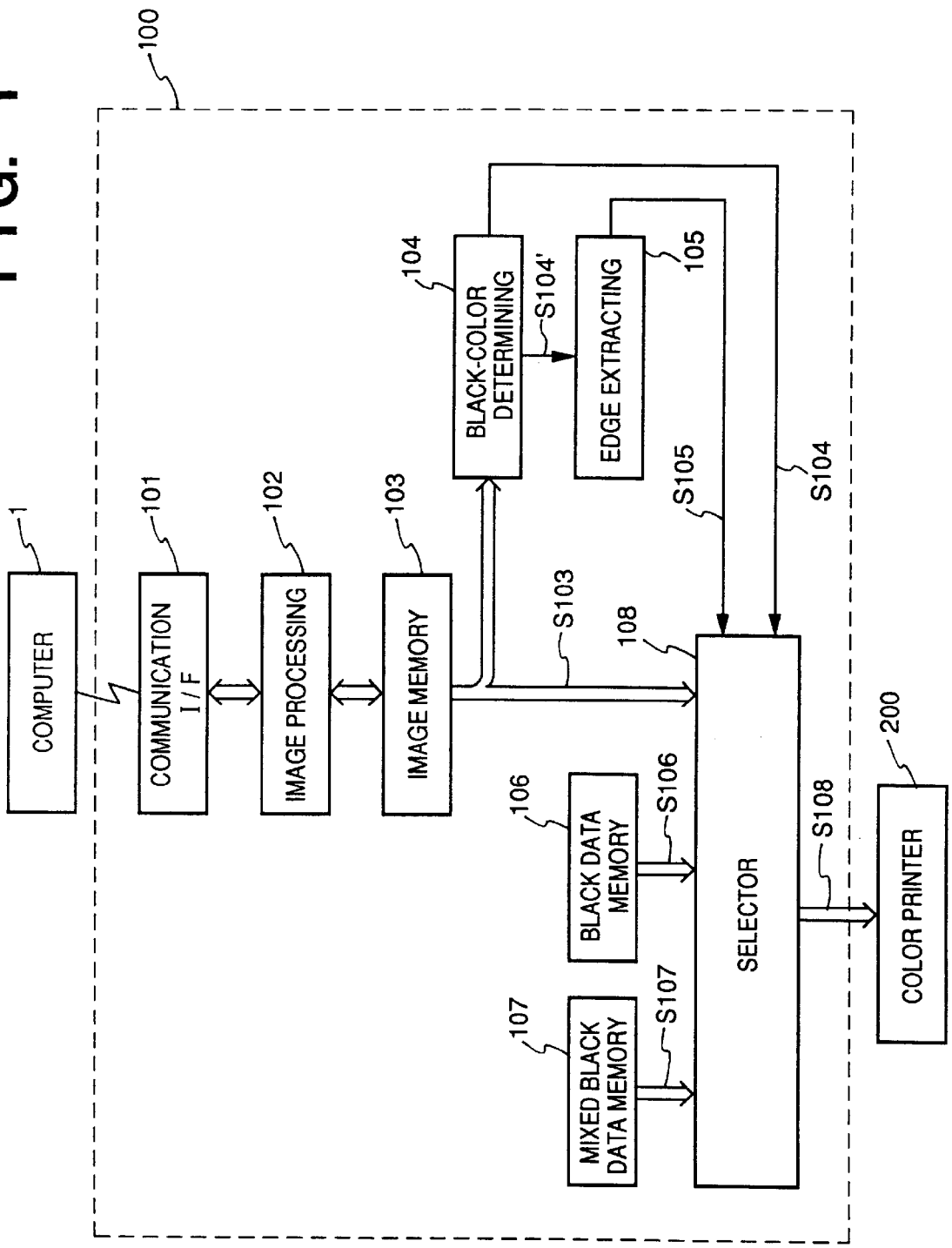
FIG. 1 is a block diagram showing a construction of a first embodiment according to the present invention.

One embodiment of the present invention will be described in detail hereinafter with reference to the drawings. FIG. 1 is a block diagram of one embodiment according to the present invention. This embodiment shows an example of a printer system constructed as follows. Image processing instructions, such as in a page description language, created in a computer 1 are received in a printer interface 100. Targeted image data is expanded on an image memory in the printer interface 100 and the expanded images are printed on a piece of paper or an OHP film by a color printer 200.

In FIG. 1, the construction of this embodiment includes the computer 1 which creates image control instructions, such as in a page description language, and outputs them to the printer interface 100 and the color printer 200. A description will be given in regards to an example in which image formation processing is performed in the printer interface 100 according to the image processing instructions from the computer 1 and pursuant to which the formatted images are outputted to the color printer 200. However, the present invention is not limited to the construction of the printer system of this embodiment, and other types of constructions may be considered. For example, the present invention may be modified such that the computer 1, the printer interface 100 and the color printer 200 may be integrated into an independent printer. Or it may be constructed such that the computer, 1 may function as the printer interface 100 and performs data communication with the color printer 200. The device may also be constructed such that the color printer 200 includes the printer interface 100 therein. Furthermore, an image scanner may be connected to the computer 1 and the image data which is scanned by the image scanner may be processed in the computer in a predetermined way and outputted by the printer shown in FIG. 1. As is understood from the foregoing description, the application of the present invention to a copying machine is certainly within an assumed range of the modifications. Thus, in the case where the computer 1 functions as the printer interface 100, the present invention can be achieved by software programming. The above-mentioned various modified constructions are not shown in the drawings since they are clearly understood from FIG. 1.

The printer interface 100 includes a communication interface (communication I/F) 101 which communicates with the computer 1 and which mainly receives printing data and control instructions from the computer 1, an image processing section 102 which creates image data for printing according to the printing data or the control instructions, an image memory 103 which stores the image data created by the control of the image processing section 102, a black-color determining means 104 which determines whether or not pixel data S103 transmitted from the image memory 103 to a selector 108 is black, and an edge extracting means 105 which determines whether or not the pixel data S103 transmitted from the image memory 103 to the selector 108 exists in an edge portion.

The printer interface 100 also includes a black-color data memory section 106 which only stores black data by determining the density data of the black color as "FF" and that of the other colors as "OO", a mixed black-color data memory section 107 which determines the black color as "FF" and which stores the density data of each color component in a range from "OO" to "FF" so that all of the components of the other colors become black when they are overlapped and so that toner is not scattered, and the selector 108 which selects one of the pixel data S103 outputted from the image memory 103, the black-color data S106 and the mixed black-color data (including half-tone data) S107, by the determining signals S104 and S105 from the black-color determining means 104 and the edge extracting means 105, respectively, and which outputs the selected image data to the printer 200.

Figure 2:
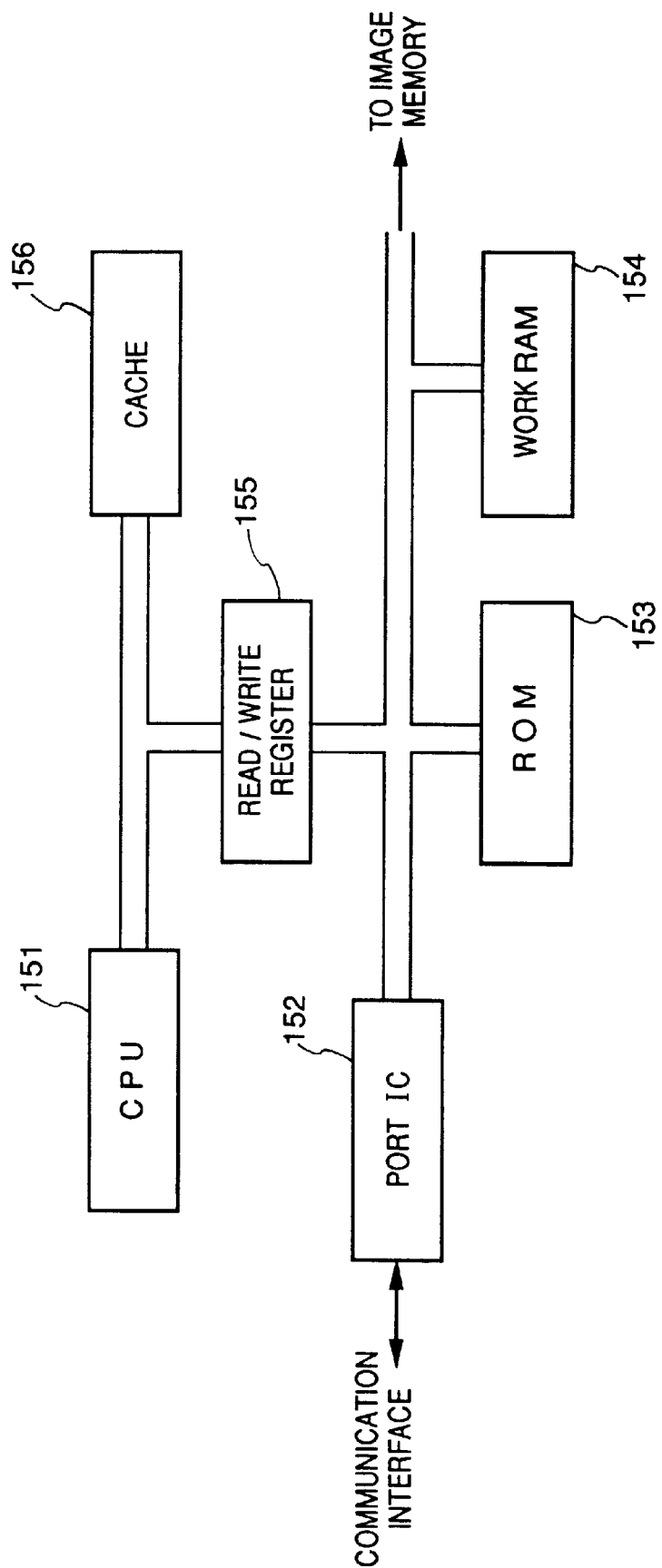
FIG. 2 is a block diagram showing a detailed construction of an image processing section in FIG. 1.

The image processing section 102 illustrated in FIG. 1 is a circuit which includes a port IC 152 for communicating with the communication I/F 101, a ROM 153 for storing procedures and fonts of a CPU 151, a work RAM 154 for auxiliary storage, a read/write register 155 for controlling the data communication between the CPU 151 and the ROM 153, the work RAM 154, and a cache memory 156 for reducing the amount of read/write load for obtaining high performance, all shown in FIG. 2. The image processing section 102 also executes the high-speed image processing by using, for instance, the high speed CPU 151 shown in FIG. 2. The image processing section 102 may be so constructed that the individual components may be composed of ICs or that the whole section may be composed of a dedicated image processing chip. In this embodiment, every time the image processing section 102 recieves an image processing instruction via the communication interface 101, it processes the instruction and then expands a raster image (dot image) to the image memory 103. This expansion processing is well-known and will not be described in detail.

The image memory 103 illustrated in FIG. 1 comprises four planes corresponding to four colors such as cyan, magenta, yellow and black. That is, the images which are processed in the image processing section 102 are expanded into a cyan image memory 103 (C), a magenta image memory 103 (M), a yellow image memory 103 (Y) and a black image memory 103 (Bk).

The image data expanded by the image memory 103 are initially written in a shift register 1041 in units of 1 byte by the control signals from the image processing section 102, and then they are converted into serial image data of a raster image. The black-color determining means 104 inputs the cyan serial image data, C-DATA, the magenta serial image data, M-DATA and the yellow serial image data, Y-DATA into a comparator 1042 which outputs "1" when all the values of these data are equal, and outputs the black color signal S104'. This is one example of the performance of the black-color determining means 104.

The edge extracting means 105 shown in FIG. 1 will be described with reference to FIGS. 4–7.

Figure 4:
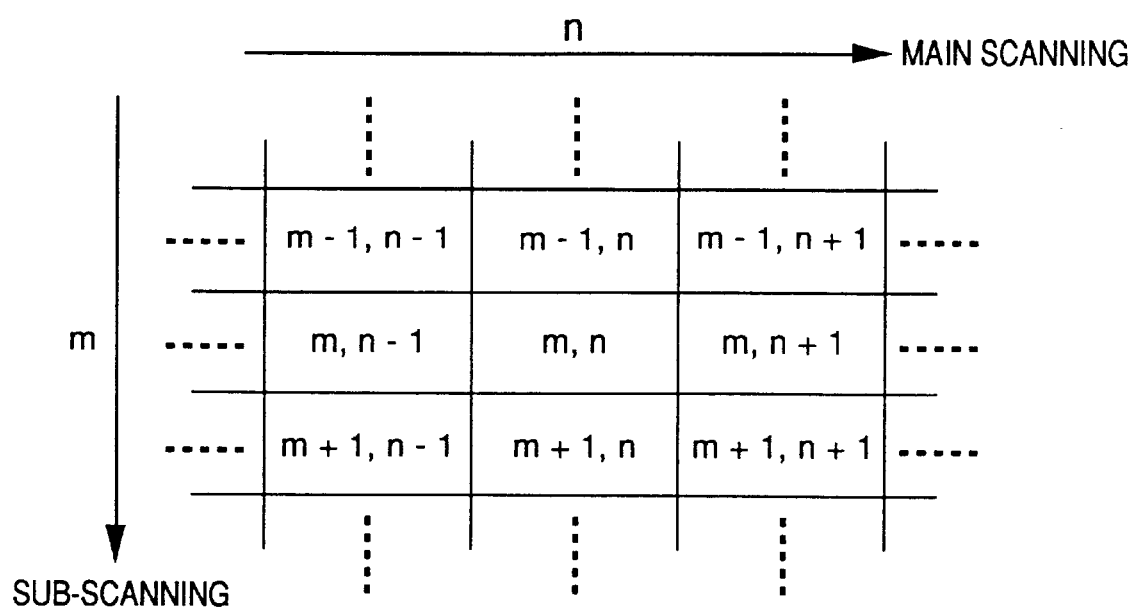
FIG. 4 shows the relationship between the positions of an object pixel and surrounding pixels in image data of the present embodiment.
Figure 5:
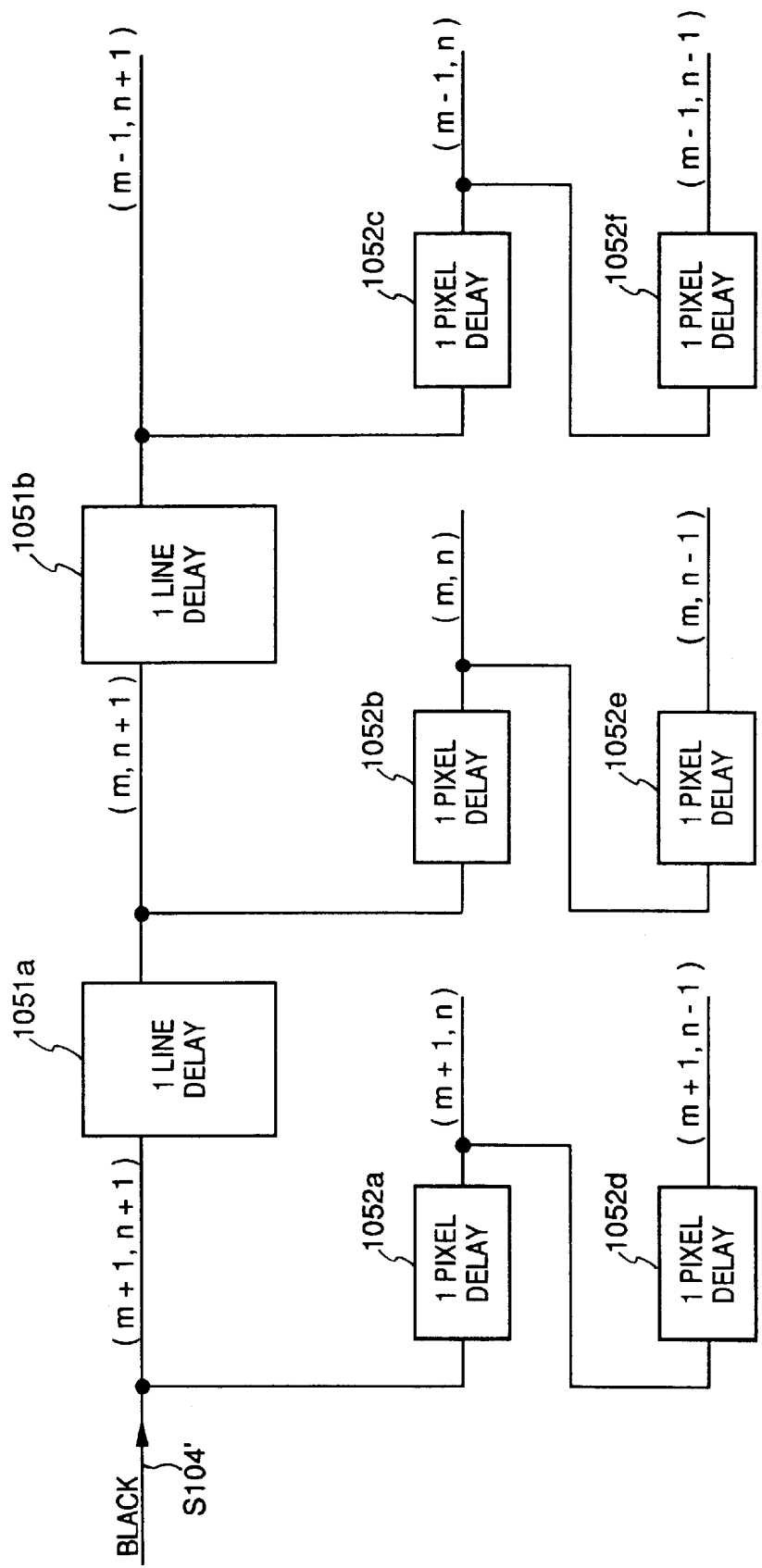
FIG. 5 is a block diagram for determining whether or not the object pixel and the surrounding pixels of the edge extracting means in FIG. 1 include black data.
Figure 6:
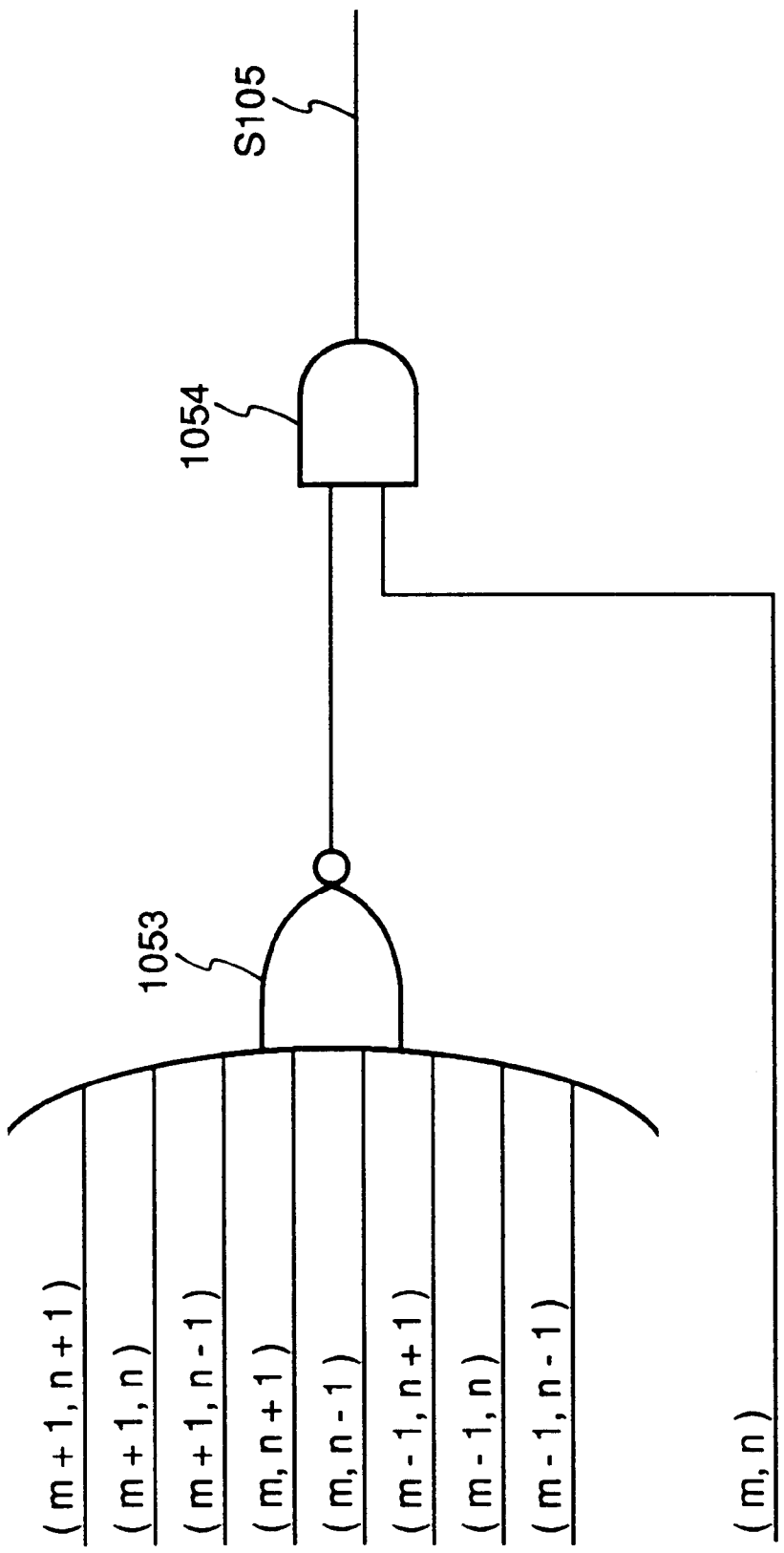
FIG. 6 is a diagram depicting obtaining a signal indicating whether or not the object pixel exists in an edge portion from the signals obtained from the circuit block of FIG. 5.
Figure 7:
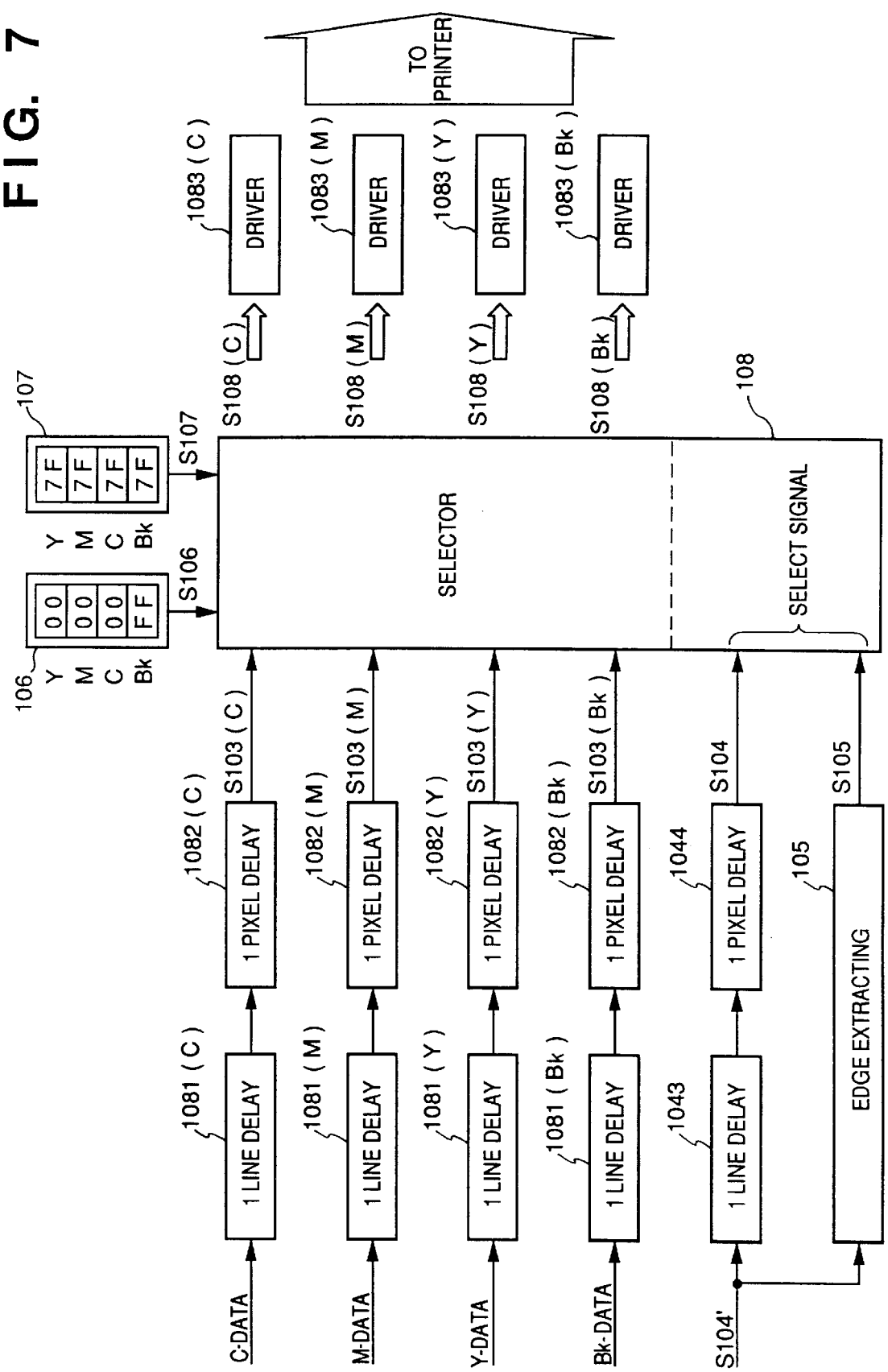
FIG. 7 is a block diagram showing a detailed construction of a selector section and its surrounding portions in FIG. 1.

Edge detection by the edge extracting means 105 in this embodiment is achieved specifically by, for example, the circuit constructions partially illustrated in FIGS. 5–7. It will be assumed that a pixel (m, n) positioned at one point of the image in the image memory 103 shown in FIG. 4 is an object pixel. Then, in the case where any of the pixels in the eight areas surrounding the object pixel (m, n), that is, (m−1, n−1), (m−1, n), (m−1, n+1), (m, n−1), (m, n+1), (m'1, n−1), (m+1, n), (m+1, n+1) indicates "0" and the object pixel (m, n) indicates "1", the object pixel (m, n) is interpreted as being in an edge portion.

Figure 3:
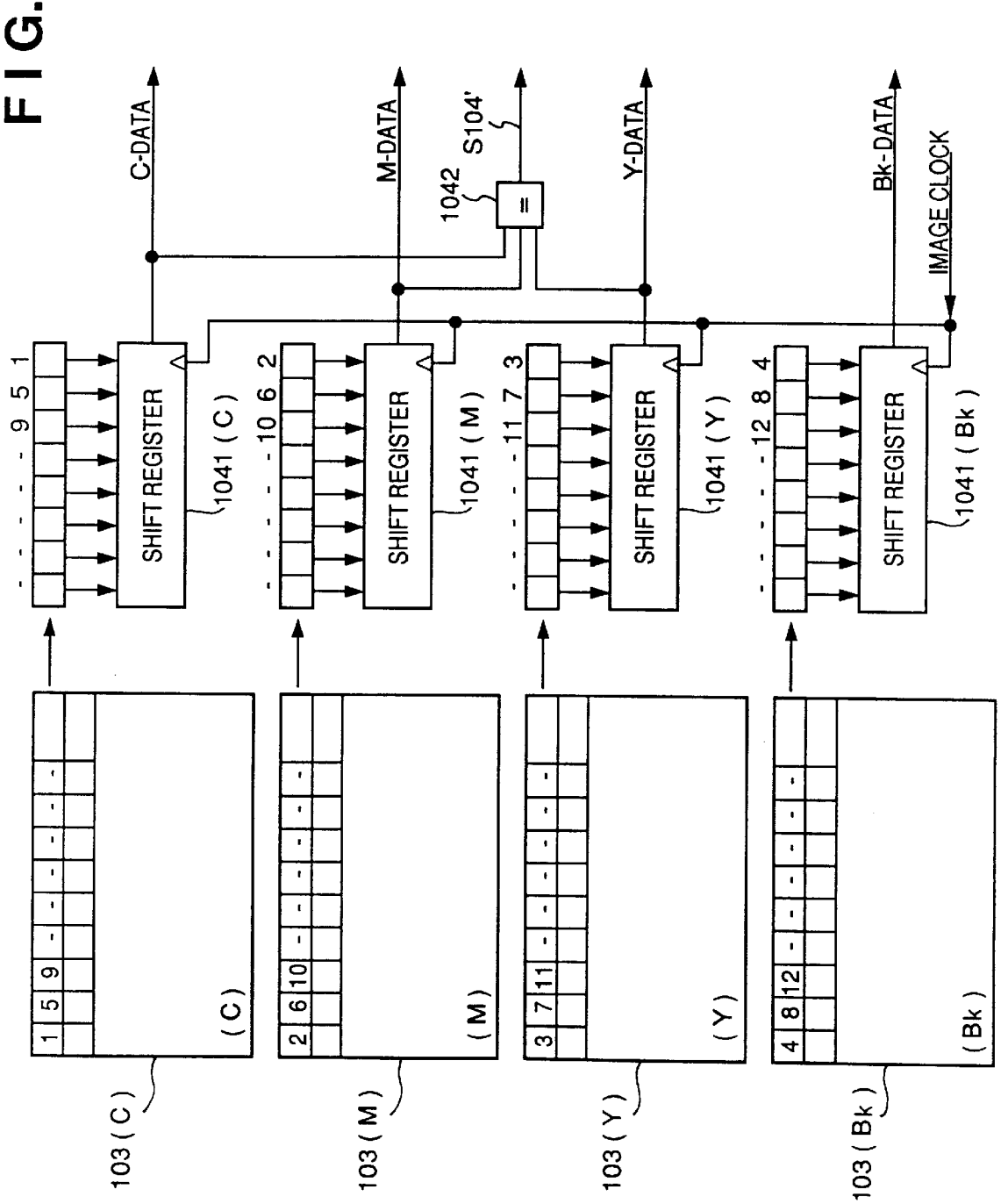
FIG. 3 is a basic diagram from an image memory to a black-color determining means in FIG. 1.

More specifically, the object pixel (m, n) and the pixel data in the eight areas surrounding the object pixel shown in FIG. 4 can be outputted through the following process. As illustrated in FIG. 5, the S104' signal from the comparator 1042 shown in FIG. 3 is inputted into 1 line delay circuits 1051*a*, 1051*b* by employing a FIFO memory or the like and 1 pixel delay circuits 1052*a*–1052*f* by employing a circuit, such as a D-flip-flop. Thus, from such pixel data, the edge signal S105 can be outputted by, for example, a NOR circuit 1053 and an AND circuit 1054 shown in FIG. 6.

All of the image data C-DATA, M-DATA, Y-DATA, Bk-DATA and the black-color signal S104' as described above are delayed for one line and one pixel (1081, 1082, 1043, 1044) shown in FIG. 7 in order to be synchronized with the edge signal S105 and inputted into the selector section 108. The edge signal S105, the black-color data signal S106 and the mixed black-color data signal S107 are also inputted into the selector section 108.

Figures 8, 9:
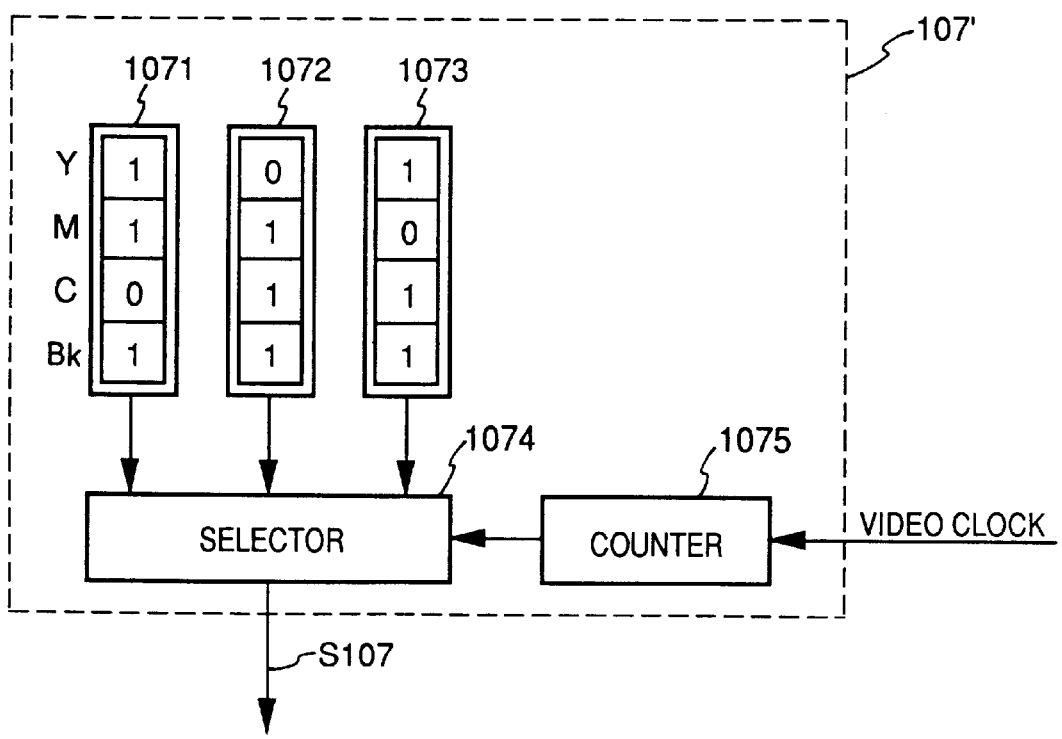
FIG. 8 represents a selection theory of the selector section in FIG. 7.
FIG. 9 is a block diagram indicating a detailed construction of a mixed black-color data section in a second embodiment according to the present invention.

The selection method in the selector section 108 is indicated in FIG. 8. The selector section 108 selects the image data S103 without performing any further selection when a pixel is other than black, and selects the black data when a pixel is positioned on an edge portion of a black character or the like, and selects the mixed black-color data produced by synthesizing the four colors when a pixel is positioned inside of the black character or the like. An image data S108 selected in the selector portion 108 is outputted into the color printer 200 via a driver 1083.

As described above, according to this embodiment, even in the case where black characters or characters printed in a black reverse or the like are expanded, only the contours can be printed in black and the inside or the outside of the contours which are designated to be printed in black can be printed in a tone or in a pseudo-tone of the three colors such as magenta, cyan and yellow as well as black.

In the first embodiment as stated above, an example of the printer system for dealing with multivalued data has been given. However, the present invention is not limited to the multivalued print data and it is certainly applicable to the printer system for dealing with binary data.

A second embodiment according to the present invention will be described wherein the present invention is applied to the binary printer system. The basic block construction of the second embodiment can be substantially the same construction illustrated in FIG. 1. However, the present embodiment deals with binary data so that, in particular, the mixed black-color data memory section 107 is constructed differently than that of FIG. 1.

In other words, the other constructions are substantially the same constructions as in FIG. 1, except for changing the multivalued data to binary data. They are as follows. Image processing instructions, such as in a page description language, are sent to the communication I/F 101 from the host computer 1 and the image processing section 102 expands the image data on the image memory 103. The black-color determining means 104 determines whether or not a predetermined pixel is black according to the image data expanded on the image memory 103. The edge extracting means 105 determines whether or not a predetermined pixel exists in an edge portion.

The construction of the mixed black-color data memory section 107' that differs from that of the first embodiment is shown in detail in FIG. 9. The black-color data memory section 106 is adapted to take a binary system by designating black only as "1" and the other colors, such as cyan, magenta and yellow as "0". Likewise, the mixed black-color data memory section 107' is adapted to take the binary system.

The binary mixed black-color data memory section 107' in the second embodiment will be described in detail with reference to FIG. 9. The following description will be given assuming that the printer may be the kind in which, for example, toner may scatter when toner in the four colors is outputted, or a recording paper may be crumpled when ink in the four colors is outputted.

In such a printer, problems may occur when four colors are outputted so that the output of toner or ink for one pixel must be restricted up to three colors. Thus, the mixed black-color data memory section 107' is constructed such that it has several tables for storing the mixed black data S107 indicated by such numbers as 1071, 1072 and 1073, and that such tables (1071–1073) are switched per pixel clock by a counter 1075 and a selector 1074.

Figure 10:
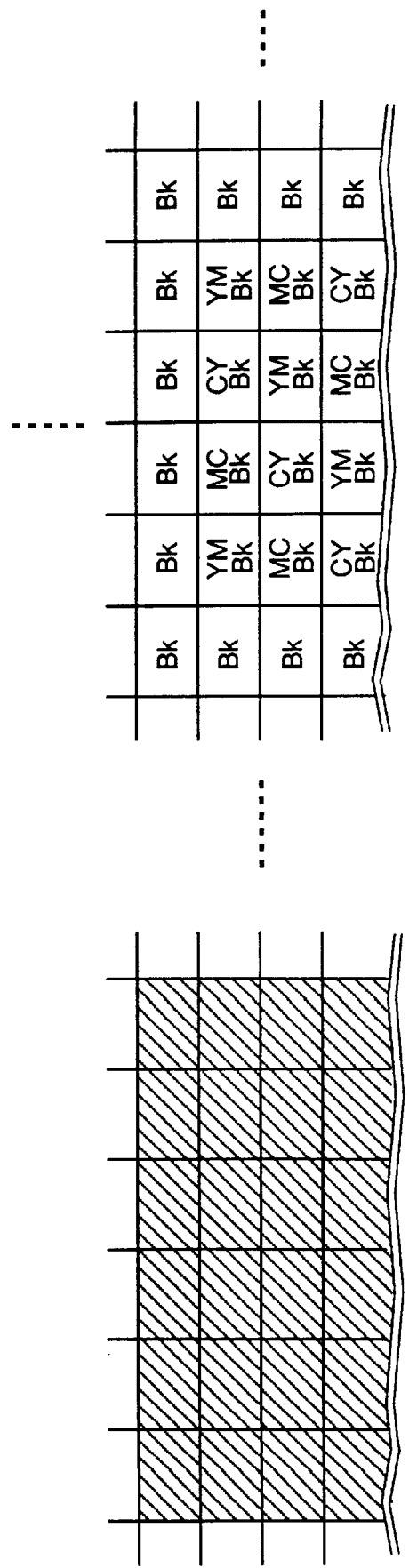
FIG. 10 represents output data sent to the printer in the second embodiment.

As illustrated in FIG. 10, by controlling in this way, the edge portions of black characters or the like, can be outputted in black only and the inside portions can be outputted in mixed black by outputting each pseudo-half tone of cyan, magenta and yellow.

As understood from the foregoing description, in each embodiment, the printer system in which images are expanded from page description language and are outputted to the printer has the following advantages. The density of ink or toner can be maintained to such a degree that a piece of paper does not crumple or toner does not scatter. Black characters or characters printed in a black reverse can be outputted without causing color fringing in the contours of the characters.

As stated above, the present invention may be applied to a system composed of a plurality of devices or it may be applied to one device.

Moreover, it goes without saying that the present invention is applicable to the case where a printer system or a device can function by a program inputted thereinto.

According to the present invention, even in the case where black characters or characters printed in a black reverse are expanded, only the contours can be printed in black and the inside or the outside portions which are designated to be printed in black can be printed in a half tone or a pseudo-half tone of the three colors such as magenta, cyan and yellow as well as black. As a result, the contours of the black portions can be printed clearly.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A printer interface comprising:
   receiving means for receiving command data from an external computer, the command data being expressed by page description language and being converted into color image data for a plurality of pixels;
   developing means for developing the color image data for the plurality of pixels corresponding to the command data received by said receiving means;

extracting means for extracting a character portion having a specific color from the color image data developed by said developing means;

color conversion means for converting the color image data developed by said developing means into density data for forming an image; and control means for controlling said color conversion means in accordance with an extraction result by said extracting means.

2. A printer interface according to claim 1, the density data from said color conversion means including yellow (Y), magenta (M), cyan (C), and black (K) color components.

3. A printer interface according to claim 1, the specific color of the character portion extracted by said extracting means being black (K).

4. A printer interface according to claim 1, further comprising storage means for storing the developed color image data from said developing means.

5. A printer comprising:

receiving means for receiving command data from an external computer, the command data being expressed by page description language and being converted into color image data for a plurality of pixels;

developing means for developing the color image data for the plurality of pixels corresponding to the command data received by said receiving means;

extracting means for extracting a character portion having a specific color from the color image data developed by said developing means;

color conversion means for converting the color image data developed by said developing means into density data for forming an image;

control means for controlling said color conversion means in accordance with an extraction result by said extracting means; and output means for outputting the color converted density data to form an image.

6. A printer according to claim 5, the density data from said color conversion means including yellow (Y), magenta (M), cyan (C), and black (K) color components.

7. A printer according to claim 5, the specific color of the character portion extracted by said extracting means being black (K).

8. A printer according to claim 5, further comprising storage means for storing the developed color image data from said developing means.

* * * * *

UNITED STATES PATENT AND TRADEMARK OFFICE
CERTIFICATE OF CORRECTION

PATENT NO. : 6,433,889 B1  Page 1 of 1
DATED : August 13, 2002
INVENTOR(S) : Ritsushi Tanabe It is certified that error appears in the above-identified patent and that said Letters Patent is hereby corrected as shown below:

Column 1,
Line 59, "form" should read -- from --.

Column 3,
Line 20, "computer," should read -- computer --.

Column 4,
Line 58, "(m'1, n-1)," should read -- (m+1, n-1), --.

Signed and Sealed this

Fourth Day of February, 2003

JAMES E. ROGAN
*Director of the United States Patent and Trademark Office*